Figure 1:
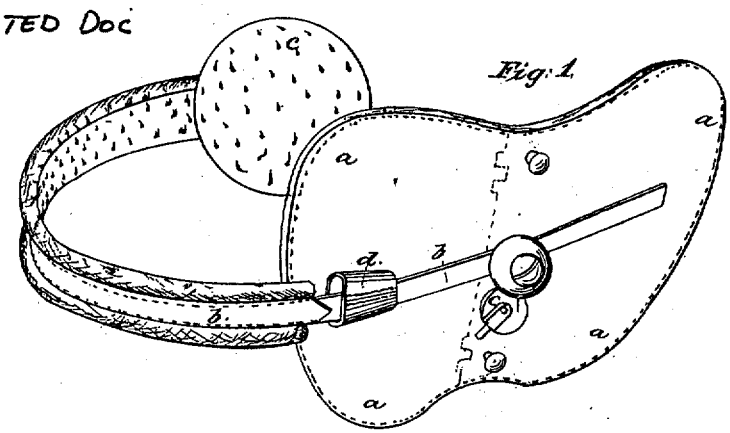

2 Sheets-Sheet 1.

A. G. Hull,

Truss.

RX 12

No. 12.

Reissued Sep. 14, 1839.

8183 X RELATED DOC

2 Sheets-Sheet 2.

A. G. Hull,

Truss. Rx12

No. 12.

Reissued Sep. 14, 1839.

RX12

UNITED STATES PATENT OFFICE.

AMOS GERALD HULL, OF NEW YORK, N. Y., ASSIGNEE OF JOHN F. GRAY, ADMINISTRATOR OF AMOS G. HULL, DECEASED.

IMPROVEMENT IN TRUSSES FOR THE CURE OF PROLAPSUS UTERI.

8183X RELATED DOC

Specification forming part of Letters Patent dated May 7, 1834; Reissue No. 12, dated September 14, 1839.

*To all whom it may concern:*

Be it known that AMOS G. HULL, late of the city of New York, deceased, did invent a surgical apparatus for the relief and cure of procidentia and prolapsis uteri and other diseases dependent on relaxation of the viscera of the pelvis, otherwise known as "Dr. A. G. Hull's Utero-Abdominal Supporter," for which invention Letters Patent were granted to said AMOS G. HULL bearing date the 7th day of May, in the year 1834. Said Letters Patent were assigned to me, AMOS GERALD HULL, by JOHN F. GRAY, administrator of the estate of the said AMOS G. HULL, deceased; and I herewith surrender the same on account of defective specification, offering the following description in amendment thereof:

A surgical apparatus for the cure of falling of the womb, (or prolapsus procidentia uteri,) which apparatus said AMOS G. HULL did make and vend by the name of "Utero-Abdominal Supporter." The inventor of this apparatus discovered that pressure made upon or against the lower part of the abodomen, in manner and by means substantially the same as herein described, does always relieve, and very often effectually cure, the malady in females commonly called "falling of the womb." Before the discovery of this apparatus the malady was treated in the last resort by the introduction of props or blocks into the vagina (passage leading to the womb) to prevent the womb from falling down or from being pressed down and out through said vagina. These props, however constructed, were called "pessaries." The pessary irritates the delicate membrane with which it is in perpetual contact, sometimes causing inflammation, ulceration, and even death, and at best it is a merely palliative expedient, tending rather to perpetuate than to cause a removal of the prolapsus by distending the vagina and tormenting the patient. Hence it occurred that before the date of this invention confirmed prolapsus was considered incurable, resisting medical treatment, and subjecting the subject of it to the unhappy necessity of wearing pessaries during the remainder of her days.

This apparatus, instead of propping up the womb from below, as the pessary does, has its main pressure above the site of that organ, above the hypogastric portion of the abdomen, and operates, as the inventor supposed, by counteracting the depressing forces of the diaphragm and upper part of the belly to relieve the womb from the weight of the intestines above it, whereby it was pushed down and extruded from the lower outlet of the pelvis. The inventor also thought that by pressing the hypogastrium obliquely upward and backward it might render the peritoneal connections of the uterus tense, and thus raise it to or suspend it in its place by a lifting process. However other surgeons might explain the principle upon which the apparatus cured the prolapsus, the inventor claimed to be the discoverer of the means by which such salutary result was effected.

Figure 3:
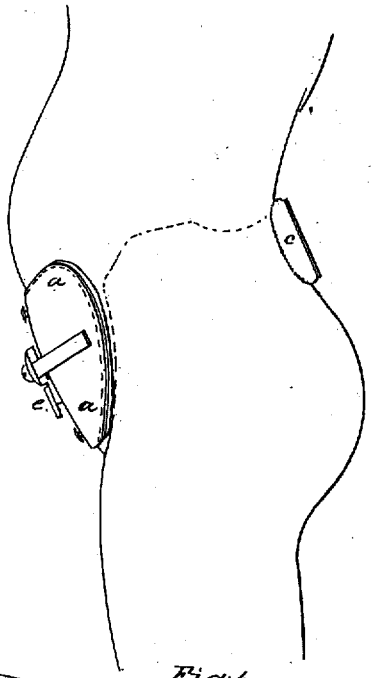

Description of the utero-abdominal supporter: This apparatus consists, in part, of a hypogastric pad, *a a a a*, Figure 1, made of such size and shape as to adapt it accurately to all that part of the moving front wall of the belly lying below a line subtended between the anterior and superior processes of the iliac bones of the pelvis. This space, which defines the size and shape of the hypogastric pad, is bound below by the pubes, and at the sides by the upright margins of the iliac or haunch bones. This pad is therefore of an irregular cordiform shape, much dilated laterally, and indented on its lower or pubic margin to correspond to the shape of the upper line of the pubes, against which it rests. The position of this pad when applied is exhibited in Fig. 3.

Figure 4:
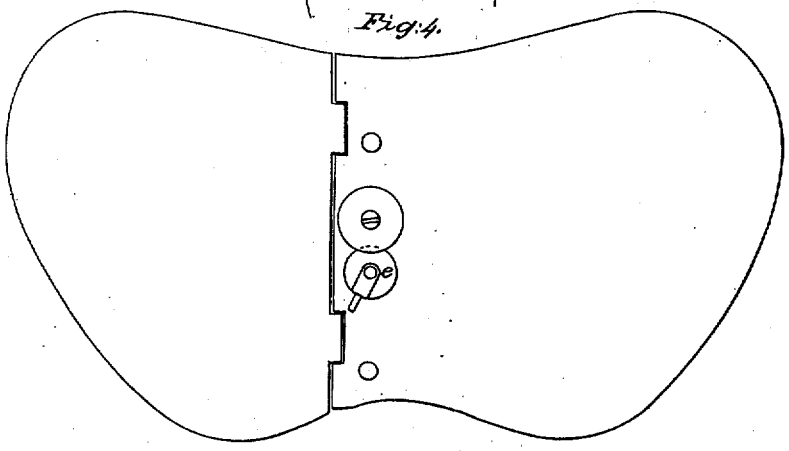

This pad (the hypogastric) is made of a thin plate of metal or other suitable material, divided near its vertical axis into two wings by a hinge contrivance, as seen in Fig. 4, which represents the pad-plate of its ordinary size. The object of this hinge contrivance is to give to the inner or belly aspect of the whole pad a form which approaches that of a double inclined plane, the angle of which double plane may be increased or diminished to any desirable or necessary extent with facility, without removing the apparatus from the patient, by means hereinafter named. The plate of the hypogastric pad may also, in some cases, be made entire without the hinge. The pad-plate, whether hinged or not, is covered with cloth and leather, or either, and wadded on its inner aspect, so as to make a proper cushion for the belly of the patient.

The utero-abdominal supporter further consists of a steel spring, *b b*, Fig. 1, and a back pad, *c*, Fig. 1, like the springs and counter-pads ordinarily used in trusses for ruptures, in which the spring encompasses one-half the body and the back pad rests on the spine of the patient. The spring is covered with cloth and leather or other suitable material. In front the spring crosses the center of the back or outer surface of the hypogastric pad, and terminates, as shown at *f*, Fig. 1, on the left segment or side of it, near the edge. The spring may be made fast at the center of the outer surface of the pad by means of a button-headed mortise, through which it should pass, or any convenient fixture. In some instances it is desirable to make the strongest pressure by the lower or pubic portion of the hypogastric pad. To effect this the rotary wedge of Amos G. Hull's truss for varicocele, patented July 5, 1833, may be attached so as to play between the spring attachment to the pad and the back of the pad (see Figs. 1, 3, and 4) at *e*. In many cases it is found serviceable to make a much stronger pressure than can be conveniently derived from the spring alone, which may be effected by conveying a strap from the back or counter pad, *c*, around the side of the body opposite the spring *b b* to the hypogastric pad, making a complete elastic belt around the pelvis, as seen in Fig. 2, where said strap *f f* is divided into two thongs, *g g*, which are made fast by two knobs on the back of said hypogastric pad.

Figure 2:
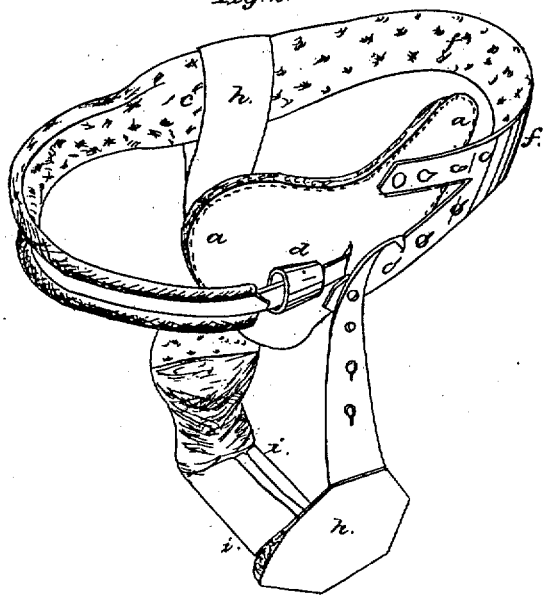

This apparatus further consists of a sliding wedge, *d*, Figs. 1 and 2, interposed between the right segment of the hypogastric pad and the spring where it covers that part of the pad. The spring being hoop-shaped, and terminating on the left half of the pad, where it presses much the strongest, this wedge equalizes the pressure of the two segments or halves of the pad, and when the vertical hinge in the pad-plate is used, sliding this wedge forward or backward depresses or elevates the right wing, segment, or half of the pad, altering the capacity of the inner or belly aspect of the pad to suit the various and changing states of the hypogastric region with respect to plumpness or convexity; and in case the patient is so formed as that the front margins of the haunch-bones project considerably, as is apt to be the case in prolapsus of long standing, the combined effect of this sliding wedge, the vertical hinge, and the free end of the spring is to sink the right and left margins of the pad *a a a a* below the level of said projecting haunch-bones, making the inner surface of the pad in this case also correspond to the shape of the hypogastric region under the various attitudes and states of the body.

In very full subjects the pad may be applied entire without the hinge.

The apparatus further consists, in some cases, of a contrivance for pressing the ano-perineal region of the body (perineum) upward and forward, called "perineal strap," *h h*, Fig. 2. The perineal strap extends from the counter-pad *c'*, Figs. 1 and 2, to the hypogastric pad, traversing closely the ano-perineal region in its course. This strap may be made of leather and cloth or other suitable material, and be fastened to the pads aforesaid by knobs or other convenient fixtures. To the inner or perineal aspect of this strap is attached a cushion, *i*, Fig. 2, made of cloth and covered with oiled silk. The cushion may be about an inch thick at right angles with the strap, and it should be of such length and so attached to the strap as to press against all the space lying between the tip of the os coccygis and the fourchette or lower end of the vulva.

What is claimed in the within-described apparatus as the invention of the late Amos G. Hull is—

The hypogastric pad *a a a a* and the employment thereof for the cure of prolapsus uteri, the same being made and operating substantially as herein set forth; likewise the combination of the said hypogastric pad with the spring *b b*, the sliding wedge *d*, and the counter or back pad, *c*; and also the combination of the perineal strap *h h* and cushion *i* with the hypogastric pad and its appendages, as herein described.

No separate part of this apparatus is claimed as new except the said hypogastric pad; nor are any of the materials of which the several parts of the apparatus are composed new or claimed as such in this specification.

AMOS GERALD HULL.

Witnesses:
Geo. Butler,
John W. Van Benschoten.